(12) United States Patent
Takushima et al.

(10) Patent No.: US 6,665,472 B2
(45) Date of Patent: Dec. 16, 2003

(54) OPTICAL FILTER HAVING CASCADED LONG-PERIOD GRATINGS

(75) Inventors: Michiko Takushima, Yokohama (JP);
Masakazu Shigehara, Yokohama (JP);
Hiroshi Suganuma, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 2 days.

(21) Appl. No.: 09/964,839

(22) Filed: Sep. 28, 2001

(65) Prior Publication Data

US 2002/0067884 A1 Jun. 6, 2002

(30) Foreign Application Priority Data

Dec. 1, 2000 (JP) ..................... P2000-367344

(51) Int. Cl.[7] .................................. G02B 6/34
(52) U.S. Cl. ..................... 385/37; 385/42; 385/140
(58) Field of Search ........................ 385/27, 37, 42, 385/140

(56) References Cited

U.S. PATENT DOCUMENTS 5,703,978 A 12/1997 DiGiovanni et al.
5,887,094 A * 3/1999 Bakhti et al. ............... 385/28
6,021,240 A * 2/2000 Murphy et al. ............. 385/37

OTHER PUBLICATIONS

M. Harumoto, M. Shigehara, M. Kakui, H. Kanamori, and M. Nishimura, "Compact Long–Period Grating Module With Multi–Attenuation Peaks," Electronics Letters, Mar. 16, 2000, vol. 36, No. 6, pp. 512–514.

* cited by examiner

*Primary Examiner*—Toan Ton
*Assistant Examiner*—Michael H Caley
(74) *Attorney, Agent, or Firm*—McDermott, Will & Emery

(57) ABSTRACT

An optical filter has a first long-period grating and a second long-period grating formed in a unitary optical fiber. A difference is not less than 100 nm between a wavelength at which optical coupling is maximum between core-mode light and cladding-mode light of a predetermined mode number in the first long-period grating and a wavelength at which optical coupling is maximum between core-mode light and cladding-mode light of the same mode number as the cladding-mode light of the predetermined mode number, in the second long-period grating. This optical filter can be constructed in compact size and can readily implement a desired transmission characteristic.

4 Claims, 18 Drawing Sheets

OPTICAL FILTER HAVING CASCADED LONG-PERIOD GRATINGS

BACKGROUND OF THE INVENTION

1. Field of the Invention

The present invention relates to an optical filter in which long-period gratings (LPGs) are formed in an optical waveguide. Unlike a short-period grating reflecting light of a specific wavelength, the long-period grating is grating converting light of a specific wavelength among core-mode light propagating in a confined state in the core region, into cladding-mode light and radiating the cladding-mode light to the outside of the cladding region, for example, as disclosed in U.S. Pat. No. 5,703,978.

2. Related Background Art

An optical waveguide (e.g., an optical fiber) in which refractive index modulation having the period of several hundred μm (long-period grating) is formed in an optical waveguide region, converts light of a specific wavelength among the core-mode light propagating in a confined state in the core region of the optical waveguide, into cladding-mode light and radiates the cladding-mode light to the outside of the cladding region. Namely, the optical waveguide with the long-period grating formed therein acts as an optical filter having wavelength selectivity. This optical filter is characterized by nonreflective nature, as apparent from the aforementioned loss producing mechanism. Therefore, the optical filter is suitably applied to uses to attenuate the core-mode light of a specific wavelength with no reflection, and is suitably applicable, for example, as a gain equalizer for equalizing gains of an optical amplifier in wavelength division multiplexing (WDM) optical communications.

An optical filter with a normal long-period grating of uniform period formed in the core region of the optical waveguide demonstrates a transmission characteristic having the shape of the Gaussian function in the wavelength band of 100 nm and having only one loss peak, as shown in FIG. 9. However, the optical filter used as the above-stated gain equalizer or the like is required to have a complex transmission characteristic as shown in FIG. 10. In order to meet this request, the optical filter as shown in FIG. 11 was proposed. This optical filter is produced in the following manner. Namely, first prepared are a plurality of optical waveguides (three in the figure). Each of the optical waveguides has a long-period grating and has margins at both ends of the grating. Then each of the long-period gratings is housed in a package, the optical waveguides are fusion-spliced between their margins, and the spliced portions are reinforced by a reinforcement. A transmission characteristic of this optical filter is superposition of transmission characteristics of the respective long-period gratings.

A conceivable reason for this is as follows. Namely, the optical filter shown in FIG. 11 is usually coated with resin 40 around the margins for the purpose of reinforcement, as shown in FIG. 12. Therefore, the cladding-mode light, into which the core-mode light has been converted in the front long-period grating LPG-a, is radiated through the resin 40 to the outside and is not recoupled with the core-mode light in the rear long-period grating LPG-b. For this reason, as shown in FIG. 13, the transmission characteristic of the optical filter (indicated by L3) results in superposition of the transmission characteristic of the long-period grating LPG-a (indicated by L1) and the transmission characteristic of LPG-b (indicated by L2). The transmission characteristic shown in FIG. 13 is that of the optical filter wherein in the long-period grating LPG-a the period of refractive index modulation is 361 μm and the grating length 13 mm and wherein in the long-period grating LPG-b the period of refractive index modulation is 356 μm and the grating length 15 mm. However, the optical filter in the structure wherein the margins are fusion-spliced as shown in FIG. 11 is of large size and it is thus difficult to house the entire filter in a package.

In order to make the whole filter compact enough to be housed in a package, it can be contemplated that the optical filter is constructed by forming a plurality of long-period gratings in tandem in a unitary optical waveguide. In this configuration, there is no need for provision of the margins for fusion splicing and thus the whole of the optical filter can be made compact. However, the transmission characteristic of the optical filter of this structure is different from a desired one, which is superposition of transmission characteristics of the respective long-period gratings in the unitary optical waveguide.

A conceivable reason for this is as follows. Supposing two long-period gratings LPG-a and LPG-b are formed in tandem in a unitary optical waveguide to constitute an optical filter, as shown in FIG. 14, the cladding-mode light, into which the core-mode light has been converted in the front long-period grating LPG-a, will be recoupled with the core-mode light in the rear long-period grating LPG-b. For this reason, the transmission characteristic of this optical filter becomes complex and different from superposition of transmission characteristics of the respective long-period gratings LPG-a and LPG-b, as shown in FIG. 15, and prediction of the characteristic is not easy. Each of the long-period gratings LPG-a and LPG-b herein is of structure similar to that shown in FIG. 13, and the spacing between them is 2 mm.

In contrast with it, Document "M. Harumoto et al., "Compact long-period grating module with multi-attenuation peaks," Electron Lett., Vol. 36, No. 6, pp.512–514 (2000)" describes the optical filter that can be formed in compact size and that can readily implement a desired transmission characteristic. The optical filter described in this Document is one wherein two long-period gratings LPG-a and LPG-b5 are formed in tandem in a unitary optical waveguide, as shown in FIG. 16. In this optical filter, a mode number of cladding-mode light to be coupled with core-mode light in the long-period grating LPG-a is different from that in LPG-b5 in the waveguide band used in communications.

For example, suppose in the front long-period grating LPG-a the period of refractive index modulation is 361 μm and the grating length 13 mm, in the rear long-period grating LPG-b5 the period of refractive index modulation is 415 μm and the grating length 14 mm, and the spacing between them is 2 mm. In this configuration, the mode numbers of the cladding-mode light to be coupled with the core-mode light in the communication wavelength band (1525 nm to 1565 nm; so-called C-band) are six in the front long-period grating LPG-a and five in the rear long-period grating LPG-b5. Therefore, the sixth cladding-mode light, into which the core-mode light has been converted in the front long-period grating LPG-a, is rarely recoupled with the core-mode light in the rear long-period grating LPG-b5. Therefore, as shown in FIG. 17, the transmission characteristic of this optical filter (indicated by L1) becomes nearly equal to superposition of transmission characteristics of the two long-period gratings LPG-a and LPG-b5 (indicated by L2).

SUMMARY OF THE INVENTION

The inventors conducted research on the above prior art and found the following problem. Specifically, FIG. 17 also shows the transmission characteristic of the configuration with the spliced portion between the two long-period gratings LPG-a and LPG-b5 (indicated by L2) and a difference between them (indicated by L3), in addition to the transmission characteristic of the configuration with the two long-period gratings LPG-a and LPG-b5 formed in tandem in the unitary optical waveguide (indicated by L1). As seen from this figure, though the mode numbers of the cladding-mode light to be coupled with the core-mode light in the C-band are made different from each other between the two long-period gratings LPG-a and LPG-b5, the transmission characteristic of the configuration with the two gratings formed in tandem in the unitary optical waveguide is different by about −0.25 dB to +0.32 dB in the C-band from the transmission characteristic of the configuration with the spliced portion between the two gratings.

As described above, the transmission characteristic of the optical filter described in aforementioned Document is also different from the superposition of the transmission characteristics of the respective long-period gratings LPG-a and LPG-b5, and prediction of the characteristic is not easy. For example, in the case of a long-haul optical communication system the transmission distance of which is even several thousand km, the difference can adversely affect the operation of the system and result in degradation of communication characteristics.

The present invention has been accomplished in order to solve the above problem and an object of the invention is to provide an optical filter that can be constructed in compact size and that can readily implement a desired transmission characteristic.

An optical filter according to the present invention is an optical filter for attenuating light of a predetermined wavelength in a communication wavelength band. This optical filter comprises a unitary optical waveguide having a core region and a cladding region, and a plurality of long-period gratings formed in the optical waveguide. In first and second long-period gratings selected from the plurality of long-period gratings, a difference is not less than 100 nm between a wavelength at which optical coupling becomes maximum between core-mode light and cladding-mode light of a predetermined mode number in the first long-period grating and a wavelength at which optical coupling becomes maximum between core-mode light and cladding-mode light of the same mode number as the cladding-mode light of said predetermined mode number, in the second long-period grating. More preferably, the above difference is not less than 200 nm. This allows the optical filter to be constructed in compact size and to readily implement a desired transmission characteristic.

In the optical filter according to the present invention, at least one of the first and second long-period gratings can have a phase rotating portion. This configuration makes it easier to implement a desired transmission characteristic.

In the optical filter according to the present invention, the communication wavelength band includes a C-band (1525 nm to 1565 nm) and an L-band (1565 nm to 1610 nm), a wavelength at which optical coupling is maximum in the communication wavelength band between the core-mode light and cladding-mode light in the first long-period grating lies in the L-band, and a wavelength at which optical coupling becomes maximum in the communication wavelength band between the core-mode light and cladding-mode light in the second long-period grating lies in the C-band. This optical filter can be suitably applied to a wavelength division multiplexing optical communication system utilizing both the C-band and the L-band.

The present invention can be further fully understood from the detailed description and accompanying drawings which will follow. It is to be considered that these are presented simply for illustration of the invention and do not limit the present invention.

DETAILED DESCRIPTION OF THE PREFERRED EMBODIMENTS

Embodiments of the present invention will be described below in detail with reference to the accompanying drawings. Throughout the description of the drawings the same elements will be denoted by the same reference symbols and redundant description will be omitted.

Figure 16:
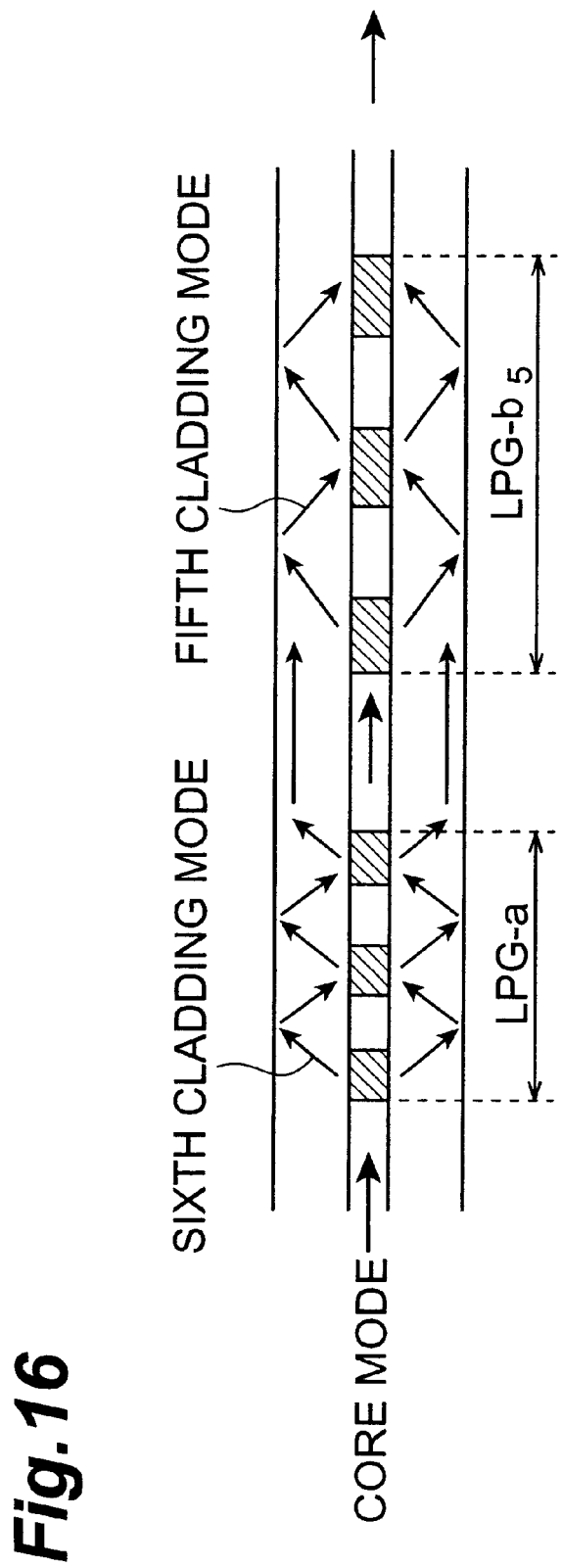
FIG. 16 is a structural view of the optical filter in which two long-period gratings are formed in a unitary optical waveguide.
Figure 17:
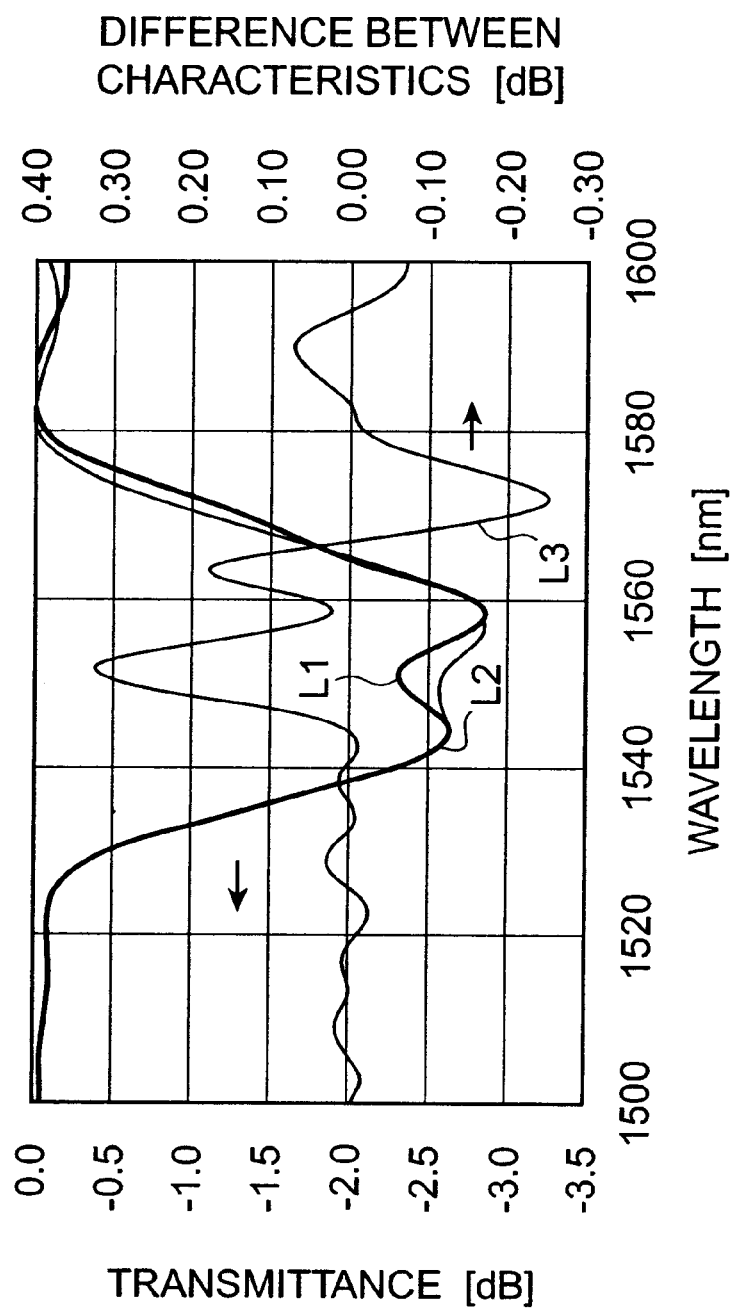
FIG. 17 is a graph showing the transmission characteristic of the optical filter in which two long-period gratings are formed in a unitary optical waveguide.
Figure 18B:
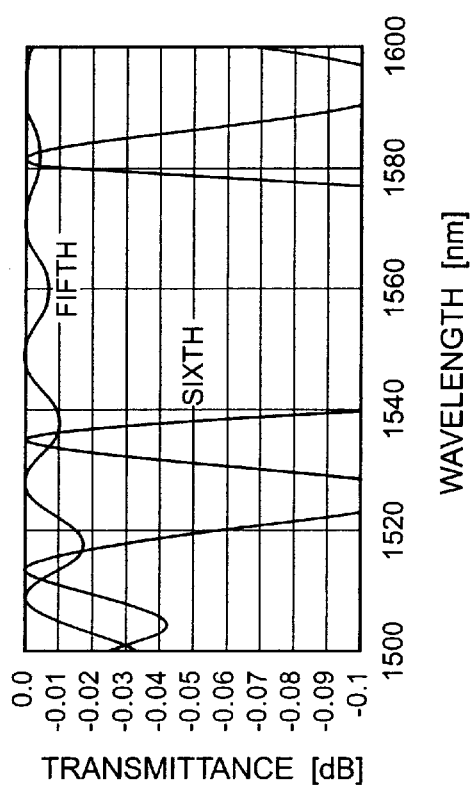
FIGS. 18A and 18B are graphs showing transmission characteristics resulting from coupling between core-mode light and cladding-mode light of each mode number in a single body of long-period grating LPG-a.
Figure 18A:
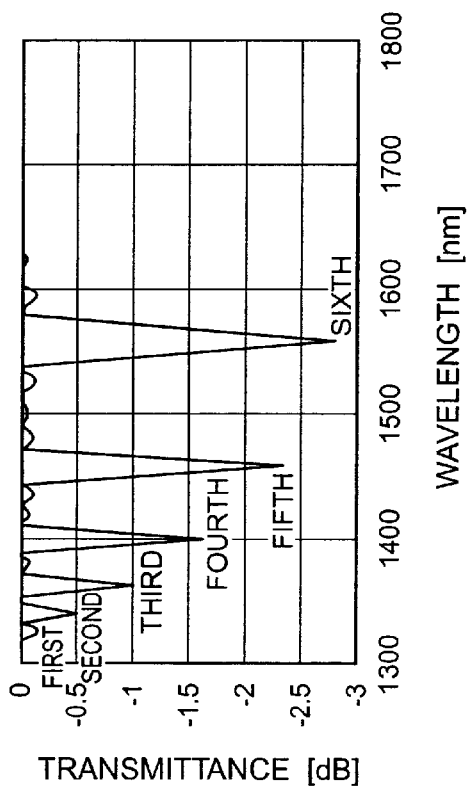
Figure 19:
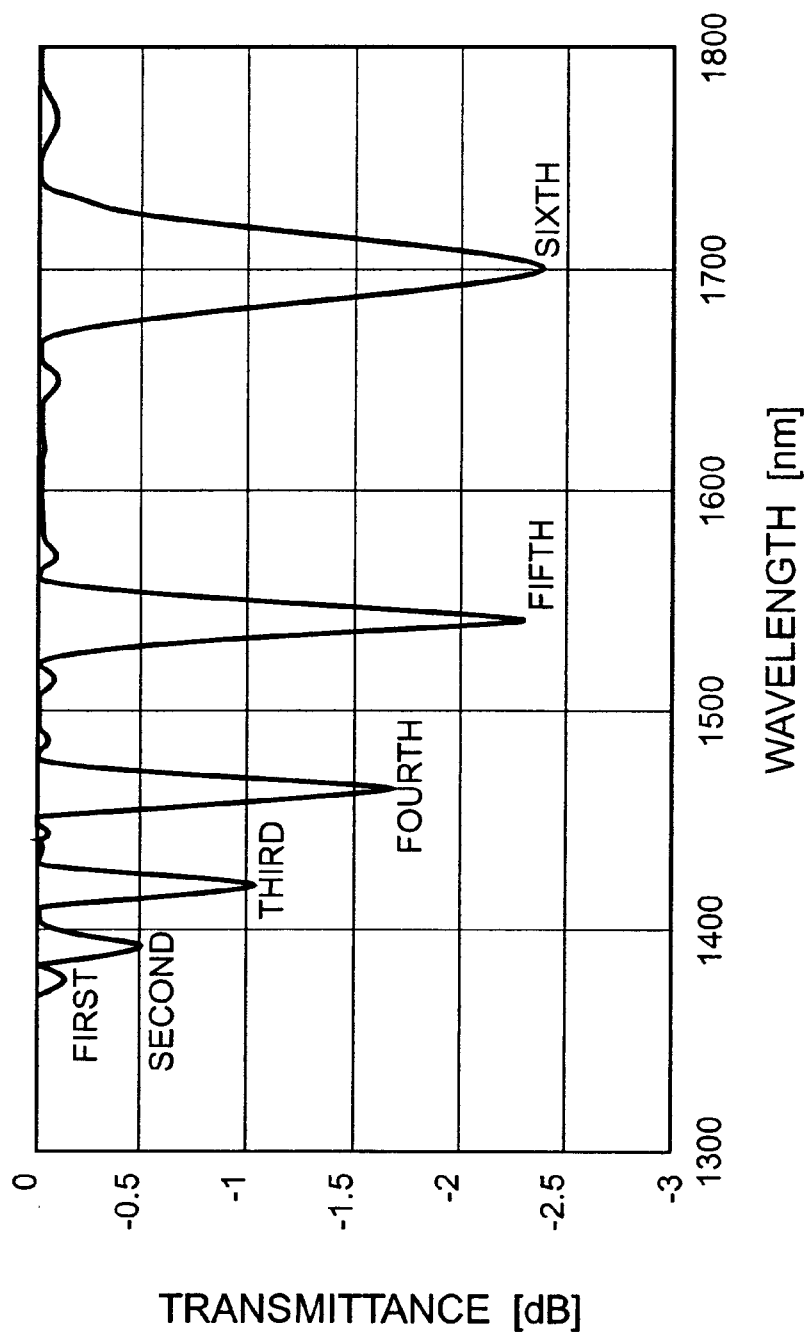
FIG. 19 is a graph showing transmission characteristics due to coupling between core-mode light and cladding-mode light of each mode number in a single body of long-period grating LPG-b5.
Figure 20:
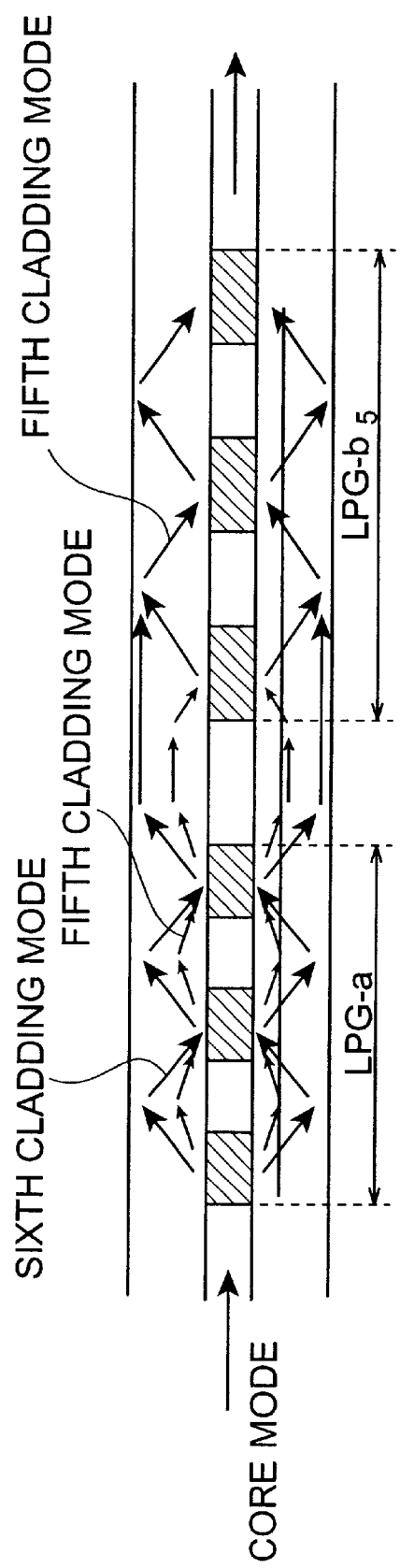
FIG. 20 is an explanatory diagram for explaining mode coupling in the optical filter in which the two long-period gratings LPG-a and LPG-b5 are formed in a unitary optical waveguide.

First, the reason for the characteristic error as shown in FIG. 17 will be discussed referring to FIGS. 18A, 18B, FIG. 19, and FIG. 20. FIGS. 18A and 18B are graphs showing the transmission characteristics resulting from coupling between core-mode light and cladding-mode light of each mode number in a single body of long-period grating LPG-a, wherein FIG. 18B is an enlarged view of FIG. 18A. FIG. 19 is a graph showing the transmission characteristics resulting from coupling between core-mode light and cladding-mode light of each mode number in a single body of long-period grating LPG-b5. FIG. 20 is an explanatory diagram for explaining mode coupling in an optical filter in which the two long-period gratings LPG-a and LPG-b5 are formed in a unitary optical waveguide. Each of the long-period gratings LPG-a and LPG-b5 herein is of structure similar to that shown in FIGS. 16 and 17.

As seen from FIGS. 18A and 18B, the sixth cladding-mode light is strongly coupled with the core-mode light in the communication wavelength band (1525 nm to 1565 nm; so-called C-band) in the single body of long-period grating LPG-a, and the loss of the core-mode light reaches the peak value of about 2.8 dB near the wavelength of 1560 nm because of the coupling with the sixth cladding-mode light. As seen from FIG. 19, the fifth cladding-mode light is strongly coupled with the core-mode light in the C-band in the single body of long-period grating LPG-b5, and the loss of the core-mode light reaches the peak value of about 2.3 dB near the wavelength of 1540 nm because of the coupling with the fifth cladding-mode light.

As seen from FIG. 18B of the enlarged view, however, while the sixth cladding-mode light is strongly coupled with the core-mode light, the fifth cladding-mode light is weakly coupled with the core-mode light in the C-band in the single body of long-period grating LPG-a. The weak coupling between the core-mode light and the fifth cladding-mode light in the long-period grating LPG-a is due to influence of the foot portion of the peak near the wavelength of 1460 nm at which the coupling becomes maximum between the core-mode light and the fifth cladding-mode light. On the other hand, while the fifth cladding-mode light is strongly coupled with the core-mode light, the sixth cladding-mode light is also weakly coupled with the core-mode light in the C-band in the single body of long-period grating LPG-b5. The weak coupling between the core-mode light and the sixth cladding-mode light in the long-period grating LPG-b5 is due to influence of the foot portion of the peak near the wavelength of 1700 nm at which the coupling becomes maximum between the core-mode light and the sixth cladding-mode light.

Accordingly, as shown in FIG. 20, the fifth cladding-mode light appearing a little in the front long-period grating LPG-a is recoupled with the core-mode light in the rear long-period grating LPG-b5. The sixth cladding-mode light, into which the core-mode light has been converted in the front long-period grating LPG-a, is slightly recoupled with the core-mode light in the rear long-period grating LPG-b5. For this reason, the transmission characteristic of the optical filter as shown in FIG. 16 is a little different from the superposition of the transmission characteristics of the respective long-period gratings LPG-a and LPG-b5, as shown in FIG. 17.

As described above, this difference is due to the influence of the foot portion of the peak near the wavelength of 1460 nm at which the coupling is maximum between the core-mode light and the fifth cladding-mode light in the long-period grating LPG-a and the influence of the foot portion of the peak near the wavelength of 1700 nm at which the coupling is maximum between the core-mode light and the sixth cladding-mode light in the long-period grating LPG-b5.

It is thus speculated that the above influence can be relaxed if the difference is large between the wavelength at which the optical coupling is maximum between the core-mode light and the cladding-mode light of the predetermined mode number in the first long-period grating and the wavelength at which the optical coupling is maximum between the core-mode light and the cladding-mode light of the same mode number as the cladding-mode light of the predetermined mode number, in the second long-period grating. The present invention was accomplished on the basis of Inventor's considerations as discussed above.

Figure 1:
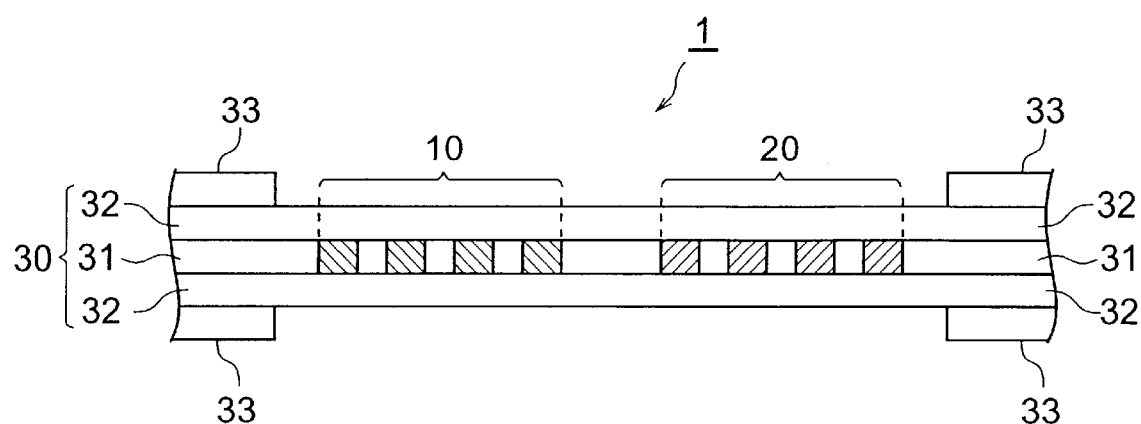
FIG. 1 is a structural view of an optical filter according to an embodiment of the present invention.

In the next place, an optical filter 1 according to an embodiment of the invention will be described. FIG. 1 is a structural view of the optical filter 1 according to the present embodiment. This optical filter 1 has such a configuration that first long-period grating 10 and second long-period grating 20 are formed in a unitary optical fiber. In this filter 1, each of the first long-period grating 10 and second long-period grating 20 is formed in a silica based optical fiber 30. The optical fiber 30 has a core region 31 doped with $GeO_2$ and a cladding region 32. Each of the first long-period grating 10 and second long-period grating 20 is made by exposing the core region 31 to ultraviolet light spatially intensity-modulated (e.g., laser light with the wavelength of 248 nm emitted from a KrF excimer laser source). In the optical fiber 30, a coating layer 33 covers the other portions than the region where the first long-period grating 10 and second long-period grating 20 are formed.

In this optical filter 1, the difference is not less than 100 nm between the wavelength at which the optical coupling is maximum in the communication wavelength band between the core-mode light and the cladding-mode light of the predetermined mode number in the first long-period grating 10 and the wavelength at which the optical coupling is maximum between the core-mode light and the cladding-mode light of the same mode number as the cladding-mode light of the predetermined mode number, in the second long-period grating 20. This difference is more preferably not less than 200 nm.

Examples of the optical filter will be described below. In the first and second examples, the first long-period grating 10 is the above-stated LPG-a (the period 361 μm and the grating length 13 mm), and the second long-period grating 20 in the first example is different from that in the second example.

Figure 2B:
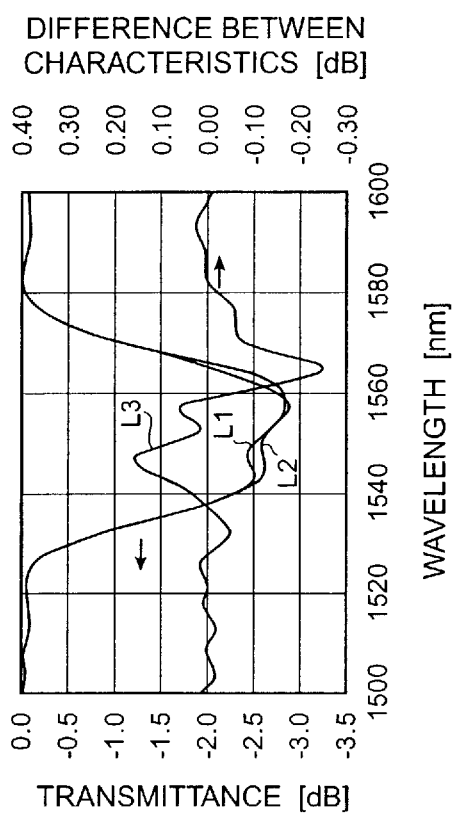
FIGS. 2A and 2B are graphs showing transmission characteristics of the second long-period grating and the optical filter in a first example.
Figure 2A:
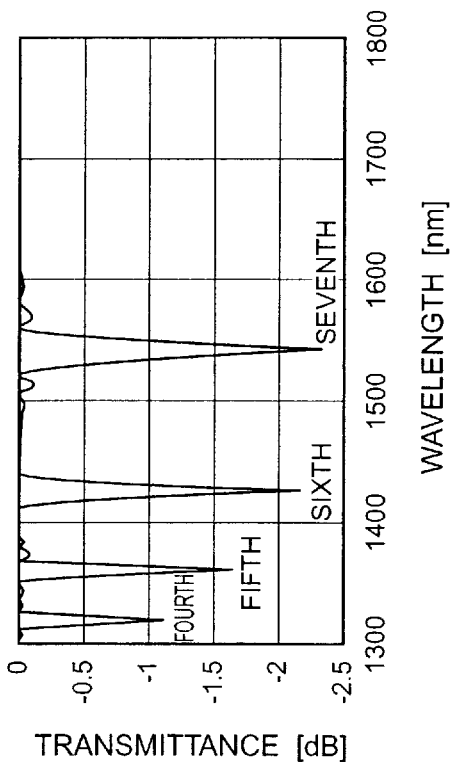

The first example will be described first. FIG. 2A is a graph showing the transmission characteristic of the second long-period grating 20 in the optical filter 1 of the first example. FIG. 2B is a graph showing the transmission characteristic of the optical filter 1 of the first example. In this example, the second long-period grating 20 is LPG-b7 (the period 305 μm and the grating length 17 mm). This long-period grating LPG-b7 has the transmission characteristic similar to that of the aforementioned long-period grating LPG-b5 in the C-band.

In this long-period grating LPG-b7, as shown in FIG. 2A, a peak wavelength of coupling between core-mode light and seventh cladding-mode light is near 1542 nm, and a peak wavelength of coupling between core-mode light and sixth cladding-mode light near 1420 nm. On the other hand, in the long-period grating LPG-a, as shown in FIG. 18A, the peak wavelength of coupling between core-mode light and sixth cladding-mode light is near 1560 nm, and the peak wavelength of coupling between core-mode light and seventh cladding-mode light over 1800 nm (not shown).

Namely, the difference is not less than 100 nm between the wavelength of 1560 nm at which the optical coupling is maximum in the C-band between the core-mode light and the sixth cladding-mode light in the long-period grating LPG-a and the wavelength of 1420 nm at which the optical coupling is maximum between the sixth cladding-mode light and the core-mode light in the long-period grating LPG-b7. The difference is not less than 100 nm between the wavelength of 1542 nm at which the optical coupling is maximum in the C-band between the core-mode light and the seventh cladding-mode light in the long-period grating LPG-b7 and the wavelength of over 1800 nm at which the optical coupling is maximum between the seventh cladding-mode light and the core-mode light in the long-period grating LPG-a, either.

As shown in FIG. 2B, the transmission characteristic of the optical filter with the long-period gratings LPG-a and LPG-b7 formed in tandem in the unitary optical fiber (indicated by L1) exhibits good agreement with the transmission characteristic of the configuration with the spliced portion between the two gratings (indicated by L2), and the difference between them (indicated by L3) is reduced to the range as small as about −0.24 dB to +0.15 dB in the C-band.

Figure 3B:
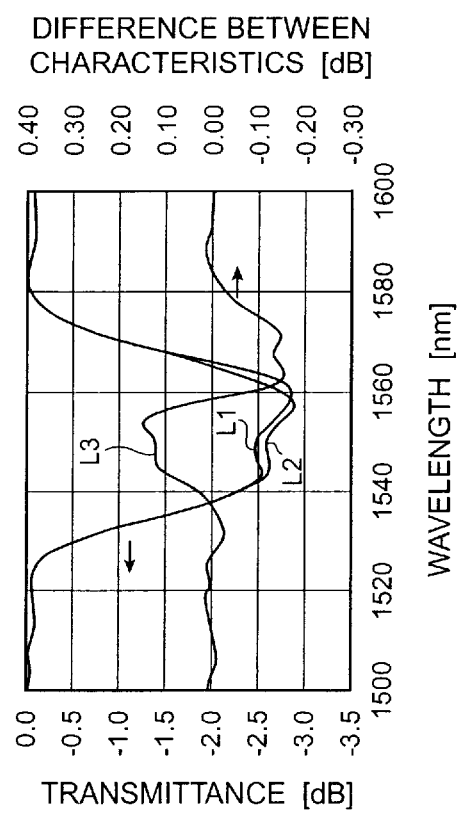
FIGS. 3A and 3B are graphs showing transmission characteristics of the second long-period grating and the optical filter in a second example.
Figure 3A:
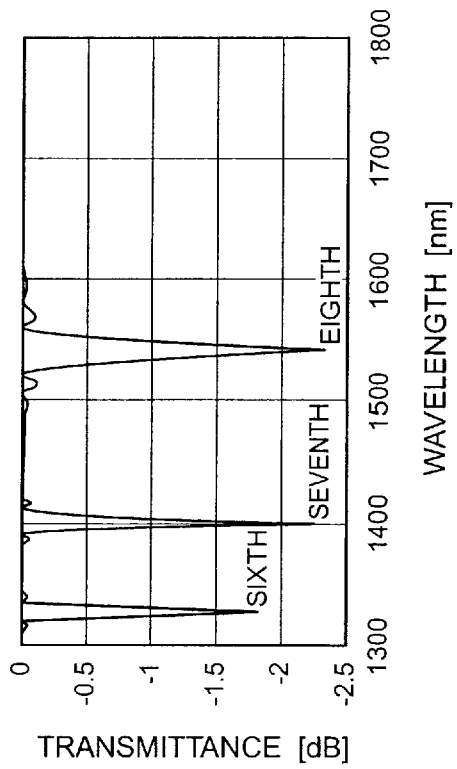

In the next place, the second example will be described. FIG. 3A is a graph showing the transmission characteristic of the second long-period grating 20 in the optical filter 1 of the second example. FIG. 3B is a graph showing the transmission characteristic of the optical filter 1 of the second example. In this example, the second long-period grating 20 is LPG-b8 (the period 262 μm and the grating length 19.5 mm). This long-period grating LPG-b8 has the transmission characteristic similar to that of the aforementioned long-period grating LPG-b5 in the C-band.

In this long-period grating LPG-b8, as shown in FIG. 3A, a peak wavelength of coupling between core-mode light and eighth cladding-mode light is near 1542 nm and a peak wavelength of coupling between core-mode light and sixth cladding-mode light near 1330 nm. On the other hand, in the long-period grating LPG-a, as shown in FIG. 18A, the peak wavelength of coupling between the core-mode light and the sixth cladding-mode light is near 1560 nm, and the peak wavelength of coupling between the core-mode light and the eighth cladding-mode light over 1800 nm (not shown).

Namely, the difference is not less than 200 nm between the wavelength of 1560 nm at which the optical coupling is maximum in the C-band between the core-mode light and the sixth cladding-mode light in the long-period grating LPG-a and the wavelength of 1330 nm at which the optical coupling is maximum between the sixth cladding-mode light and the core-mode light in the long-period grating LPG-b8. The difference is not less than 200 nm between the wavelength of 1542 nm at which the optical coupling is maximum in the C-band between the core-mode light and the eighth cladding-mode light in the long-period grating LPG-b8 and the wavelength of over 1800 nm at which the optical coupling is maximum between the eighth cladding-mode light and the core-mode light in the long-period grating LPG-a, either.

As shown in FIG. 3B, the transmission characteristic of the optical filter with the long-period gratings LPG-a and LPG-b8 formed in tandem in the unitary optical fiber (indicated by L1) demonstrates good agreement with the transmission characteristic of the configuration with the spliced portion between them (indicated by L2), and the difference between them (indicated by L3) is reduced to the range as small as about −0.15 dB to +0.14 dB in the C-band.

Figure 4A:
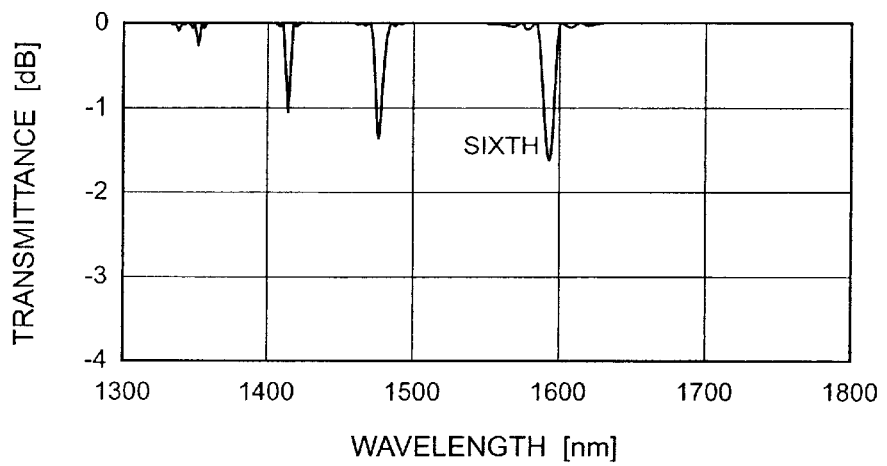
FIGS. 4A, 4B, and 4C are graphs showing transmission characteristics of the first long-period grating, the second long-period grating, and the optical filter in a third example.
Figure 4B:
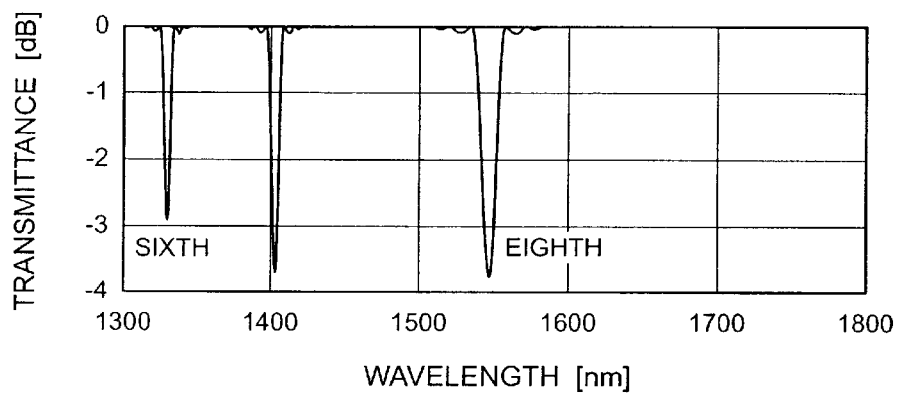
Figure 4C:
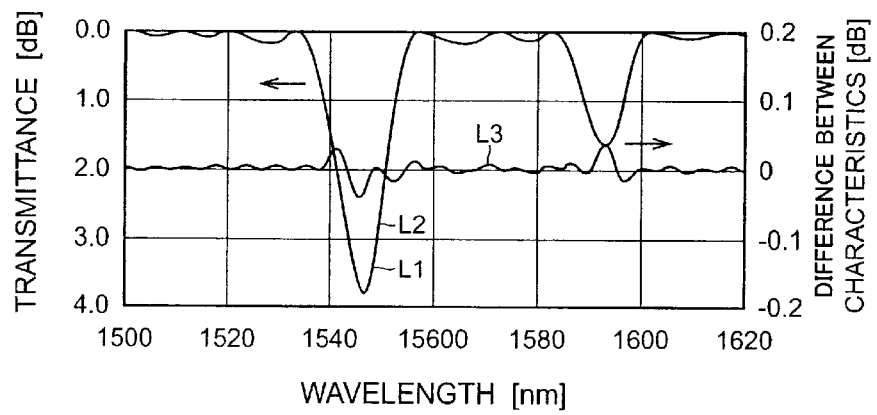

The third example will be described next. FIG. 4A is a graph showing the transmission characteristic of the first long-period grating 10 in the optical filter 1 of the third example. FIG. 4B is a graph showing the transmission characteristic of the second long-period grating 20 in the optical filter 1 of the third example. FIG. 4C is a graph showing the transmission characteristic of the optical filter 1 of the third example.

In this example, the grating period of the first long-period grating 10 is 383 μm and the grating length 35 mm. The grating period of the second long-period grating 20 is 263 μm and the grating length 30 mm.

In the first long-period grating 10, as shown in FIG. 4A, a peak wavelength of coupling between core-mode light and sixth cladding-mode light is near 1590 nm, and a peak wavelength of coupling between core-mode light and eighth cladding-mode light over 1800 nm (not shown). On the other hand, in the second long-period grating 20, as shown in FIG. 4B, a peak wavelength of coupling between core-mode light and sixth cladding-mode light is near 1325 nm, and a peak wavelength of coupling between core-mode light and eighth cladding-mode light near 1545 nm.

Namely, the difference is not less than 200 nm between the wavelength of 1590 nm at which the optical coupling is maximum in the communication wavelength band (1525 nm to 1610 nm; so-called CL-band) between the core-mode light and the sixth cladding-mode light in the first long-period grating 10 and the wavelength of 1325 nm at which the optical coupling is maximum between the sixth cladding-mode light and the core-mode light in the second long-period grating 20. The difference is not less than 200 nm between the wavelength of over 1800 nm at which the optical coupling is maximum between the core-mode light and the eighth cladding-mode light in the first long-period grating 10 and the wavelength of 1545 nm at which the optical coupling is maximum in the CL-band between the eighth cladding-mode light and the core-mode light in the second long-period grating 20, either.

As shown in FIG. 4C, the transmission characteristic of the optical filter with the first long-period grating 10 and the second long-period grating 20 formed in tandem in the unitary optical fiber (indicated by L1) demonstrates good agreement with the transmission characteristic of the configuration with the spliced portion between them (indicated by L2), and the difference between them (indicated by L3) is reduced to the range as small as about −0.04 dB to +0.04 dB in the CL-band.

In this optical filter 1 of the third example, the wavelength of 1590 nm at which the optical coupling is maximum between the core-mode light and the sixth cladding-mode light in the first long-period grating 10 lies in the L-band (1565 nm to 1610 nm), and the wavelength of 1545 nm at which the optical coupling is maximum between the core-mode light and the eighth cladding-mode light in the second long-period grating 20 lies in the C-band (1525 nm to 1565 nm). Accordingly, this optical filter 1 can be suitably applied to the WDM optical communication systems using both the C-band and L-band.

Figure 5:
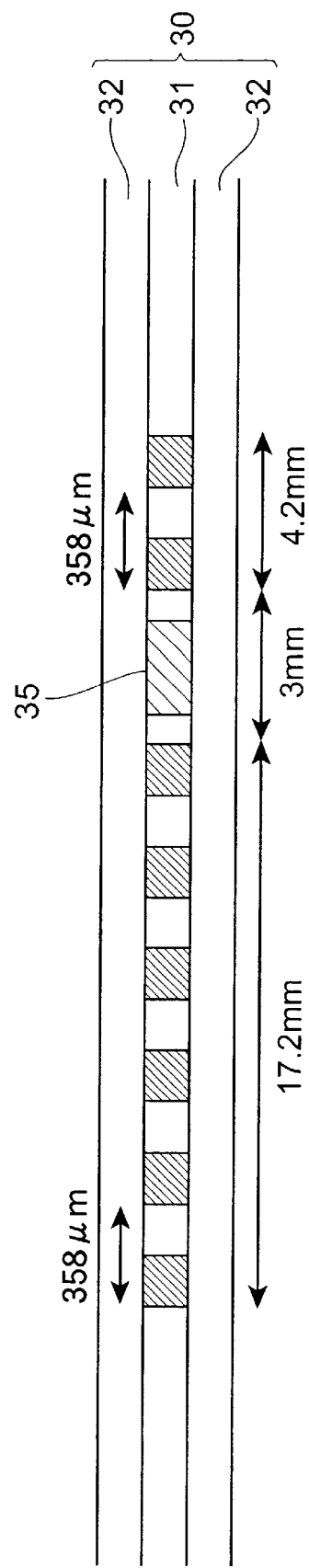
FIG. 5 is an explanatory diagram to illustrate a phase-shifted long-period grating.
Figure 6:
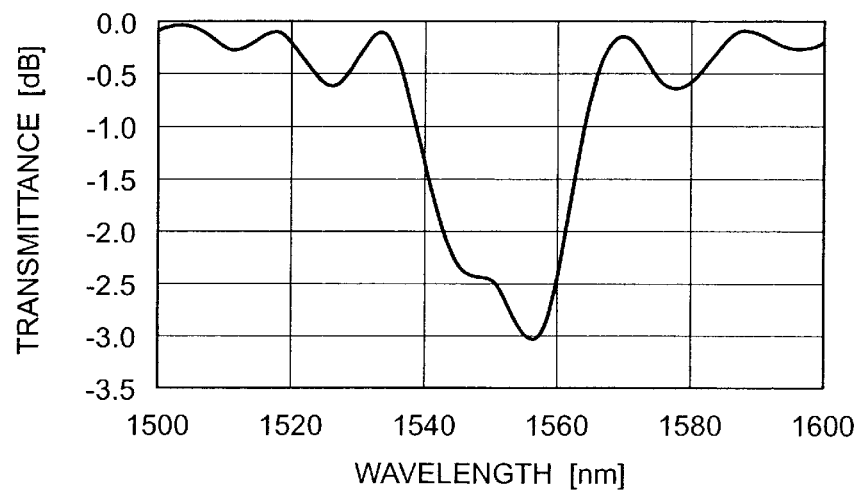
FIG. 6 is a diagram showing a transmission characteristic of the phase-shifted long-period grating.

Next, the fourth and fifth examples will be described with reference to FIG. 5 to FIG. 8. In these examples, the first long-period grating 10 is a phase-shifted long-period grating having a phase rotating portion in the middle of the grating. FIG. 5 is an explanatory view of the phase-shifted long-period grating. In this phase-shifted long-period grating, two regions having refractive index modulation of the same period of 358 $\mu$m (respective lengths of which are 17.2 mm and 4.2 mm) are formed a gap of 3 mm apart from each other and this part of the gap of 3 mm is exposed to ultraviolet light so as to adjust the refractive index there, thereby forming the phase rotating portion 35. FIG. 6 is a graph showing the transmission characteristic of the phase-shifted long-period grating. A loss peak near the wavelength of 1556 nm shown in this figure is due to coupling between the core-mode light and the sixth cladding-mode light.

Figure 7:
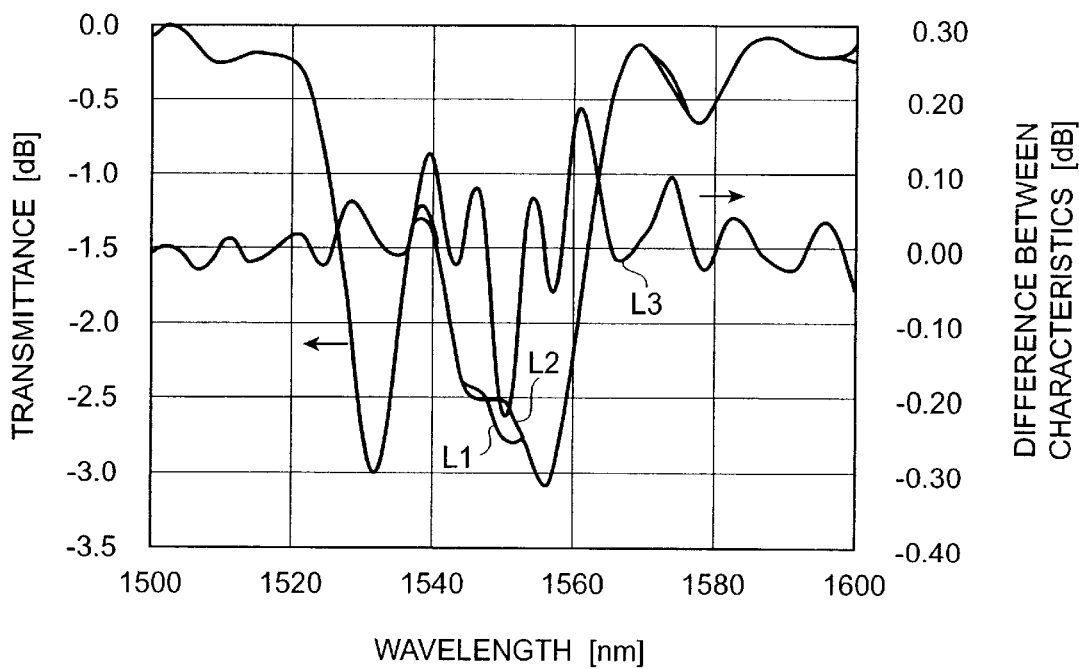
FIG. 7 is a graph showing a transmission characteristic of the optical filter consisting of the phase-shifted long-period grating and the normal long-period grating in a fourth example.
Figure 8:
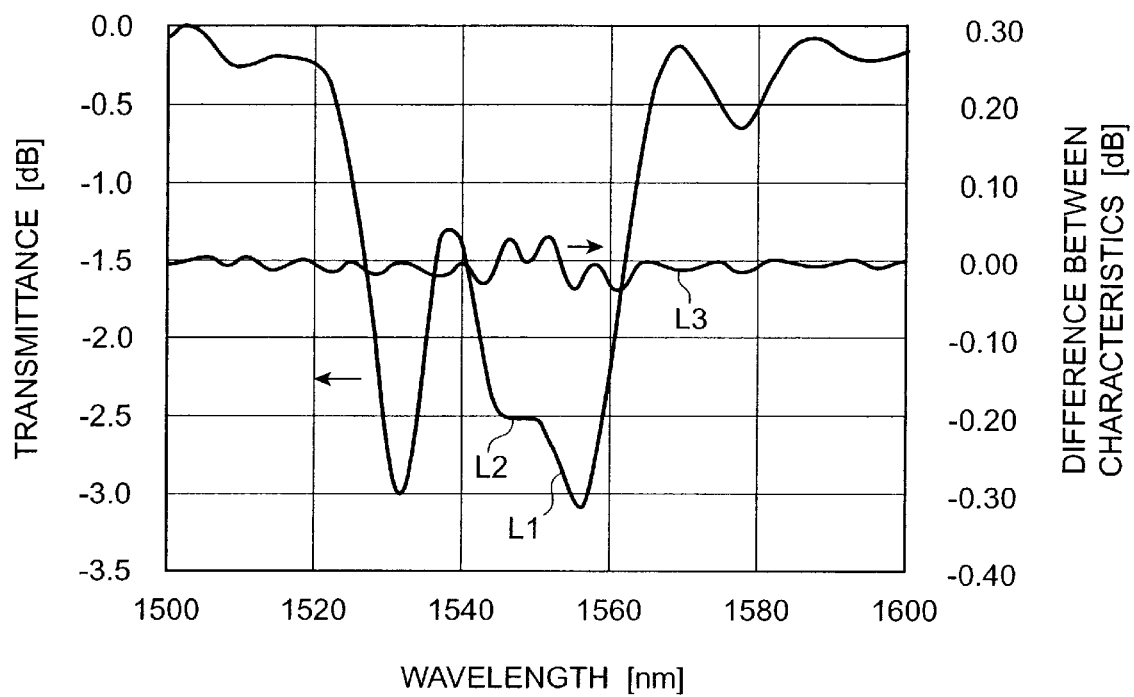
FIG. 8 is a graph showing a transmission characteristic of the optical filter consisting of the phase-shifted long-period grating and the normal long-period grating in a fifth example.
Figure 9:
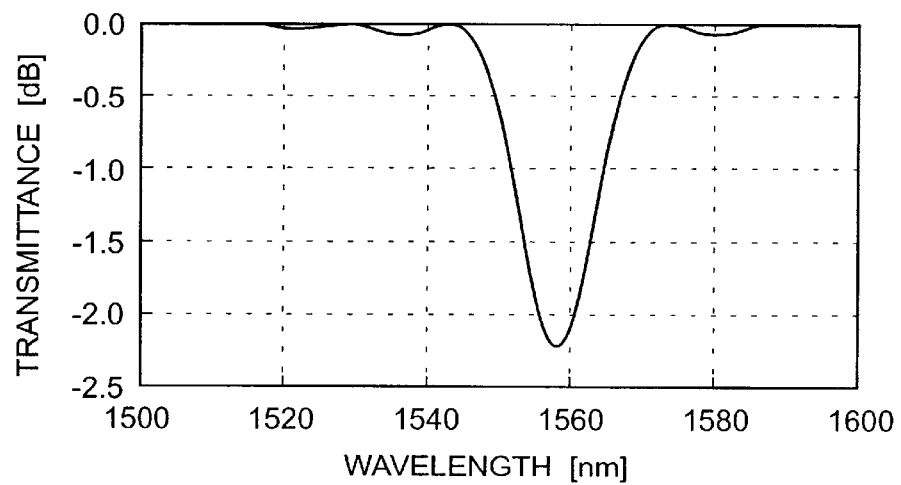
FIG. 9 is a graph showing the transmission characteristic of the optical filter in which the normal long-period grating of uniform period is formed in the core region of the optical waveguide.
Figure 10:
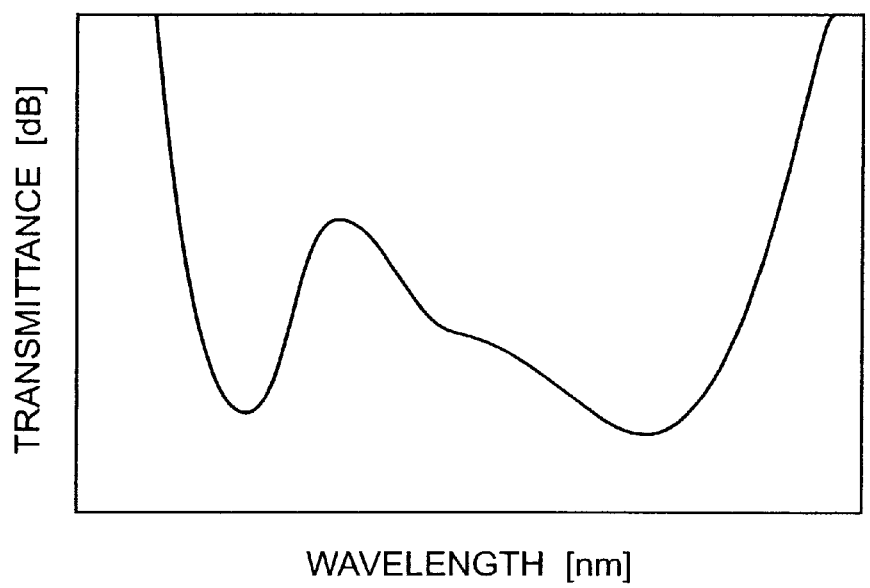
FIG. 10 is a graph showing the transmission characteristic required of the optical filter used as a gain equalizer.
Figure 11:
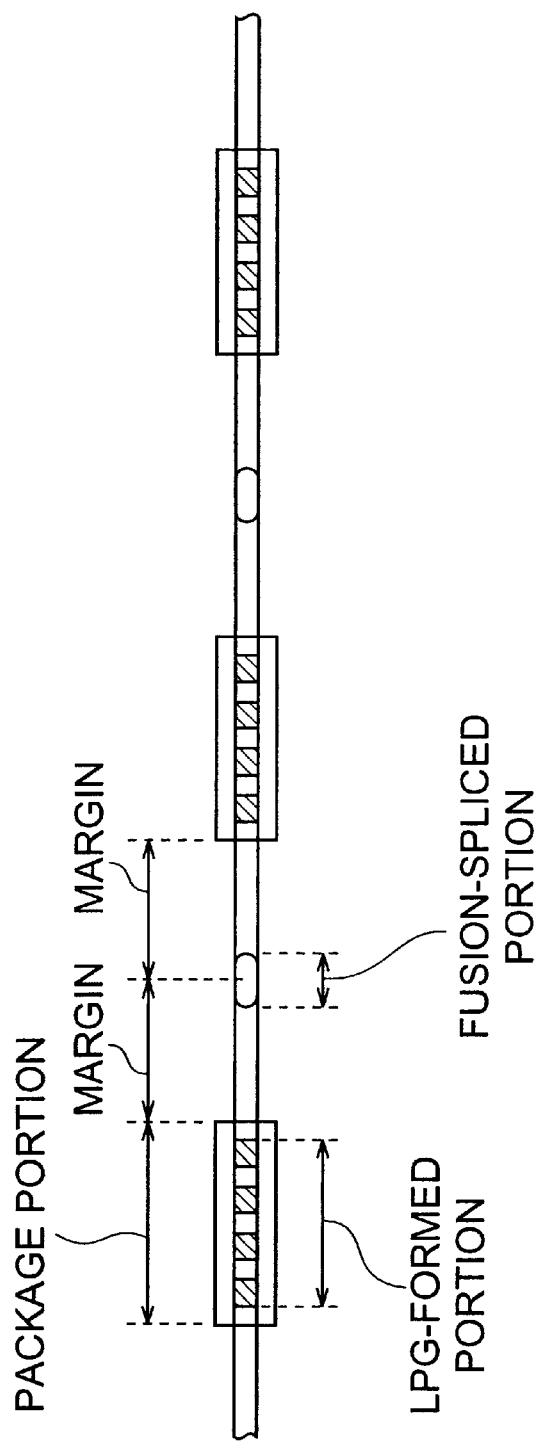
FIG. 11 is a structural view of the optical filter in which a plurality of optical waveguides each having a long-period grating are fusion-spliced between their margins.
Figure 12:
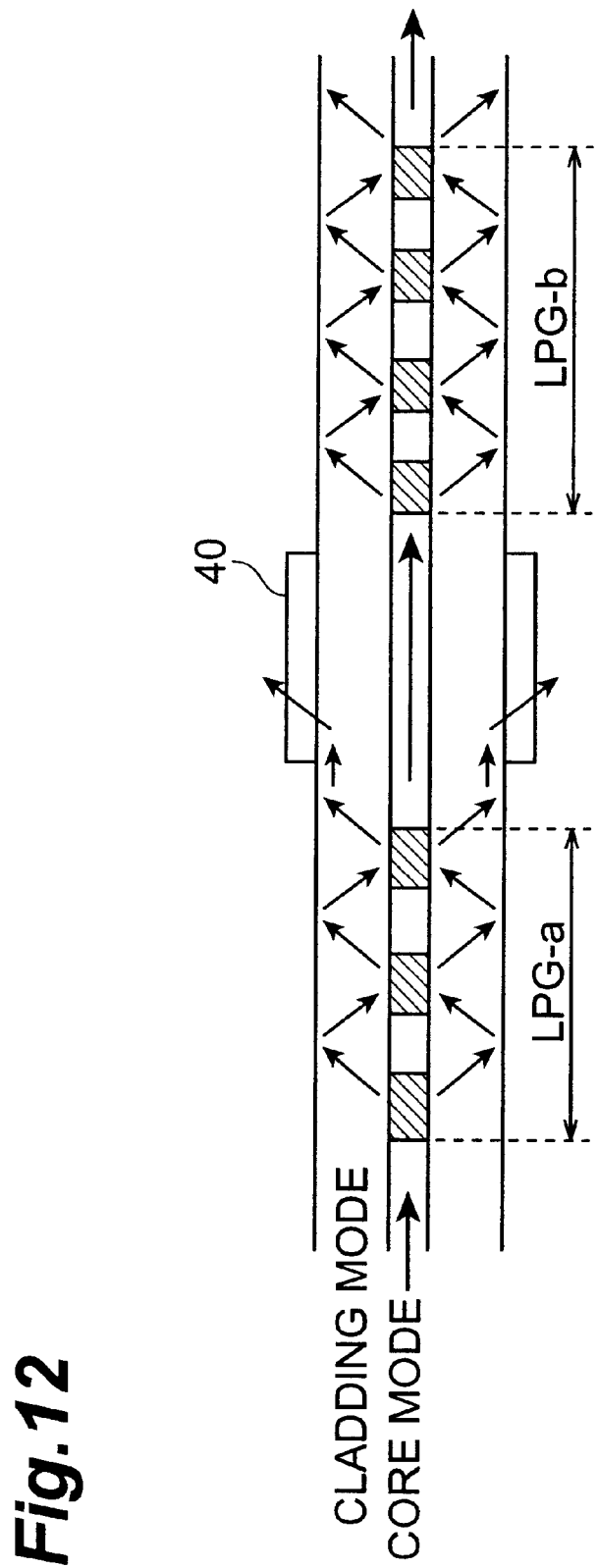
FIG. 12 is a structural view of the optical filter in which two optical waveguides each having a long-period grating are fusion-spliced between their margins(The fusion-spliced portion is not shown).
Figure 13:
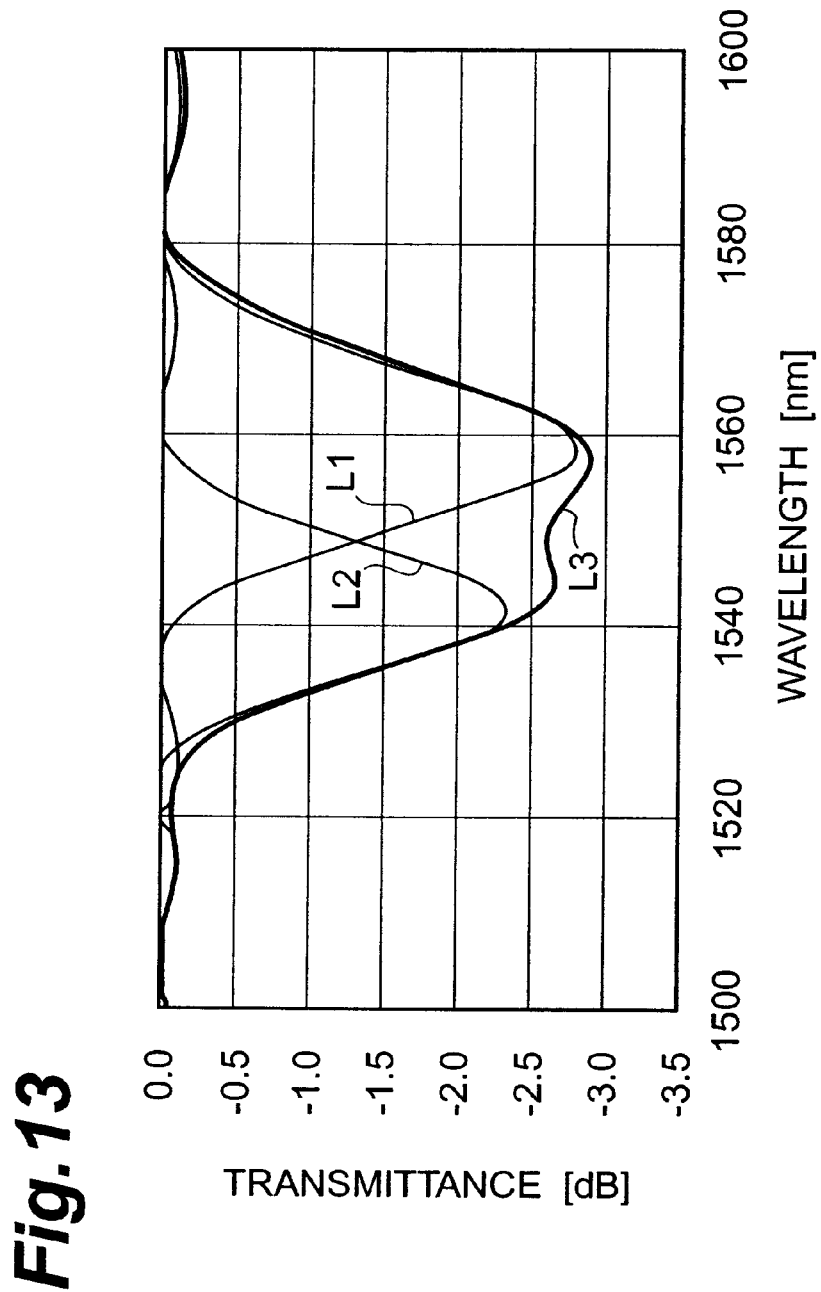
FIG. 13 is a graph showing the transmission characteristic of the optical filter in which two optical waveguides each having a long-period grating are fusion-spliced between their margins.
Figure 14:
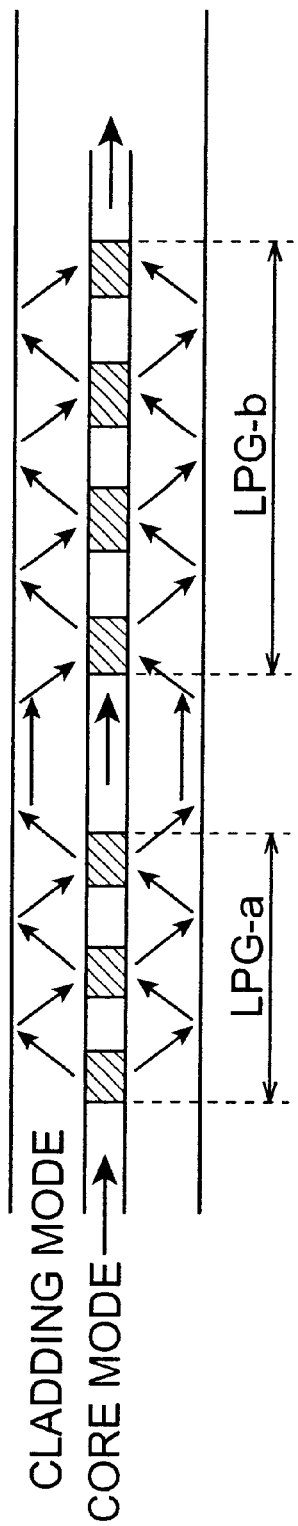
FIG. 14 is a structural view of the optical filter in which two long-period gratings are formed in a unitary optical waveguide.
Figure 15:
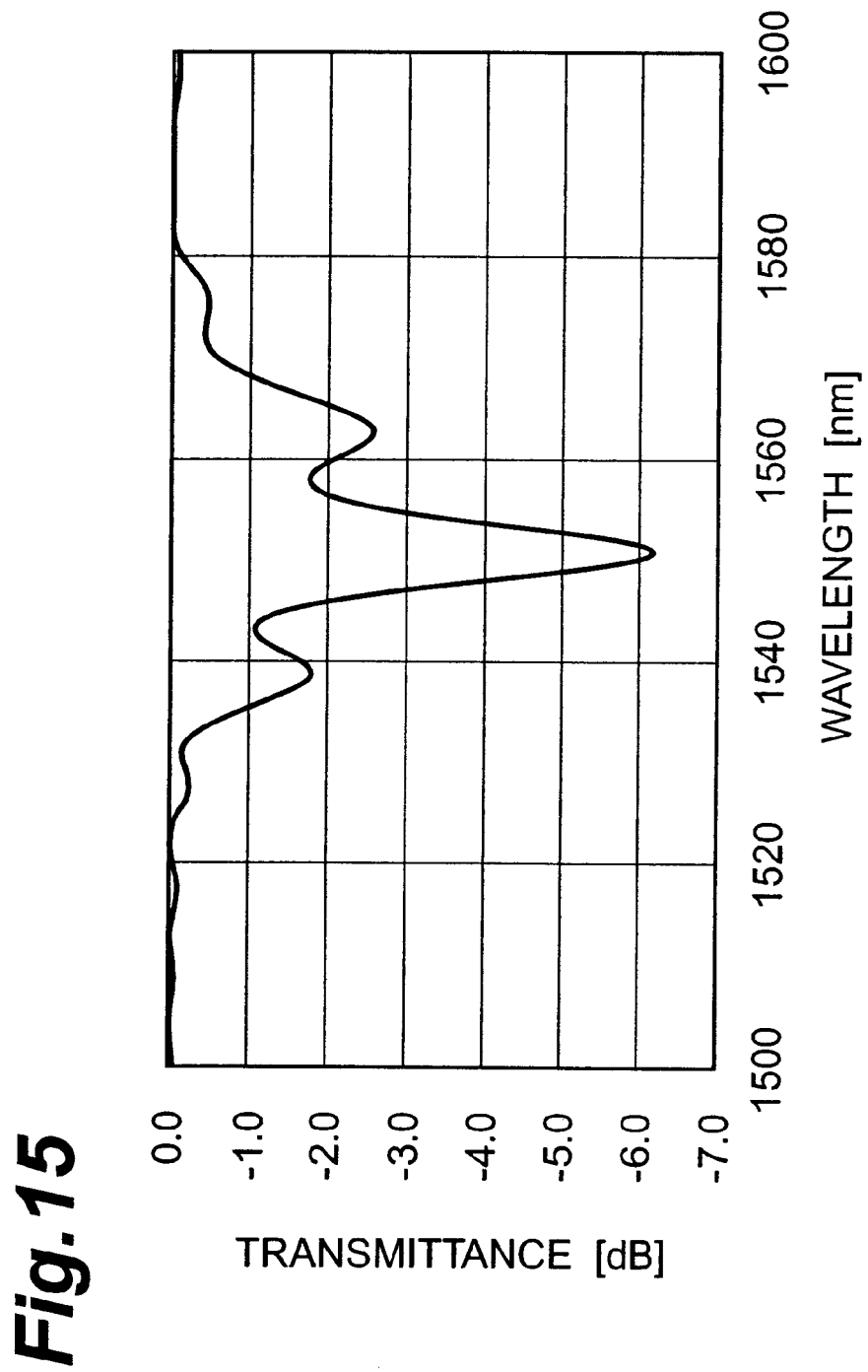
FIG. 15 is a graph showing the transmission characteristic of the optical filter in which two long-period gratings are formed in a unitary optical waveguide.

FIG. 7 is a graph showing the transmission characteristic of the optical filter of the fourth example consisting of the aforementioned phase-shifted long-period grating and a long-period grating LPG-c5. FIG. 8 is a graph showing the transmission characteristic of the optical filter of the fifth example consisting of the aforementioned phase-shifted long-period grating and a long-period grating LPG-c8.

The long-period grating LPG-c5 (the period 415 $\mu$m and the grating length 27 mm) and the long-period grating LPG-c8 (the period 261 $\mu$m and the grating length 37 mm) have similar transmission characteristics in the C-band. However, in the C-band, the long-period grating LPG-c5 has a peak of coupling between core-mode light and fifth cladding-mode light and the long-period grating LPG-c8 has a peak of coupling between core-mode light and eighth cladding-mode light.

As shown in FIG. 7, the transmission characteristic of the optical filter of the fourth example with the phase-shifted long-period grating and the long-period grating LPG-c5 formed in tandem in the unitary optical fiber (indicated by L1) exhibits good agreement with the transmission characteristic of the configuration with the spliced portion between them (indicated by L2), and the difference between them (indicated by L3) is reduced to the range as small as about −0.22 dB to +0.19 dB in the communication wavelength band C.

As shown in FIG. 8, the transmission characteristic of the optical filter of the fifth example with the phase-shifted long-period grating and the long-period grating LPG-c8 formed in tandem in the unitary optical fiber (indicated by L1) exhibits good agreement with the transmission characteristic of the configuration with the spliced portion between them (indicated by L2), and the difference between them (indicated by L3) is reduced to the range as small as about −0.03 dB to +0.03 dB in the C-band.

The present invention is not limited to the above embodiments and a variety of modifications can be made. For example, the above embodiments showed the configurations in which the two long-period gratings were formed in tandem in the unitary optical waveguide (optical fiber), but it can also be contemplated that N (N≧3) long-period gratings are formed in tandem in a unitary optical waveguide. In this case, the present invention is advantageously applied in such a way that, in any two long-period gratings out of the N gratings, a difference is not less than 100 nm and more preferably not less than 200 nm between a wavelength at which optical coupling is maximum between core-mode light and cladding-mode light of a predetermined mode number in one long-period grating and a wavelength at which optical coupling is maximum between core-mode light and cladding-mode light of the same mode number as the cladding-mode light of the predetermined mode number, in the other long-period grating.

As detailed above, the optical filter according to the present invention can be constructed in compact size and can readily implement a desired transmission characteristic.

It is apparent that the present invention can be modified in various ways, from the above description of the present invention. It is to be understood that such modifications are within the gist and scope of the present invention and improvements obvious to those skilled in the art are intended to be embraced in the scope of claims which follow.

What is claimed is:

1. An optical filter for attenuating light of a predetermined wavelength in a communication wavelength band, said optical filter comprising:

a unitary optical waveguide having a core region and a cladding region; and a plurality of long-period gratings formed each in said optical waveguide, wherein, in first and second long-period gratings selected from said plurality of long-period gratings, a difference is not less than 100 nm between a wavelength in said communication band at which optical coupling is maximum between core-mode light and cladding-mode light of a predetermined mode number in said first long-period grating and a wavelength at which optical coupling is maximum between core-mode light and cladding-mode light of the same mode number as said cladding-mode light of said predetermined mode number, in said second long-period grating.

2. The optical filter according to claim 1, wherein said difference is not less than 200 nm.

3. The optical fiber according to claim 1, wherein at least one of said first and second long-period gratings has a phase rotating portion.

4. The optical filter according to claim 1, wherein said communication wavelength band includes a C-band (1525 nm to 1565 nm) and L-band (1565 nm to 1610 nm), wherein a wavelength at which optical coupling is maximum in said communication wavelength band between the core-mode light and cladding-mode light in said first long-period grating lies in the L-band, and a wavelength at which optical coupling is maximum in said communication wavelength band between the core-mode light and cladding-mode light in said second long-period grating lies in the C-band.

* * * * *